Patented Nov. 2, 1937

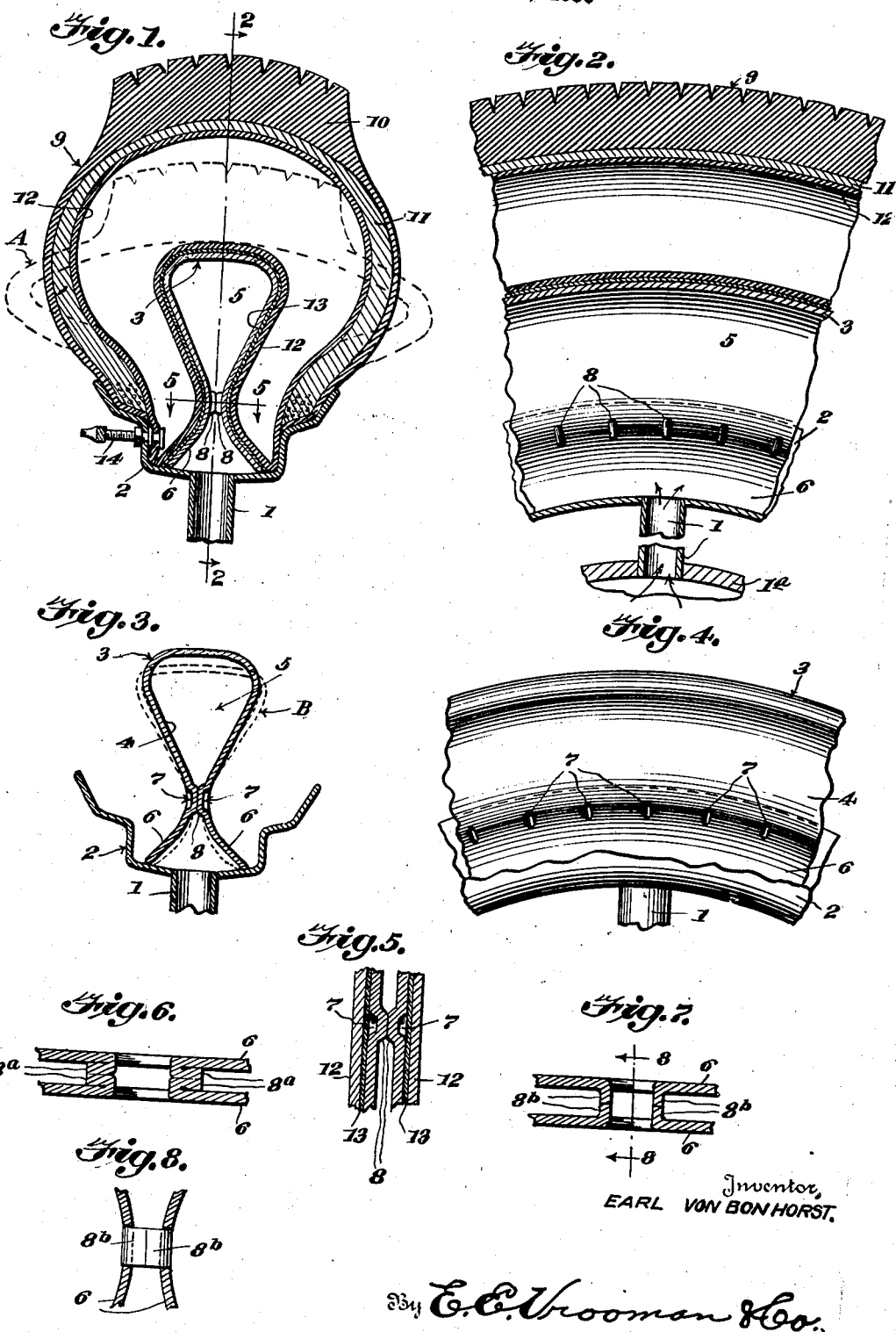

2,097,748

UNITED STATES PATENT OFFICE 2,097,748

AIR-COOLED SAFETY TIRE

Earl Von Bon Horst, San Clemente, Calif.

Application December 28, 1936, Serial No. 117,983

8 Claims. (Cl. 152—10)

This invention relates to an air-cooled safety tire.

An object of the invention is the construction of a simple and efficient tire of the nature hereinafter specifically described, which can be easily built onto or added to many of the rims already in use today.

Another object of the invention is the construction of an efficient self-cooling tire which will prevent an accident occasioned by a blowout, while at the same time allowing the car to travel in a straight line to a normal stop.

A still further object of the invention is the construction of a novel inner or auxiliary rim, which, by means of its peculiar pressed-in spacing means, is very efficiently air-cooled, whereby satisfactory results are at all times assured by using my improved device.

With the foregoing and other objects in view, my invention comprises certain novel constructions, combinations and arrangements of parts as will be hereinafter fully described, illustrated in the accompanying drawing and more particularly pointed out in the appended claims.

In the drawing:

Figure 1 is a transverse vertical sectional view of a tire constructed in accordance with the present invention.

Figure 2 is a longitudinal sectional view taken on line 2—2, Figure 1, and looking in the direction of the arrows.

Figure 3 is a transverse vertical sectional view of the primary and auxiliary rims.

Figure 4 is a view in side elevation of a tire constructed in accordance with the present invention.

Figure 5 is a sectional view (greatly enlarged) taken on line 5—5, Figure 1, and looking in the direction of the arrows.

Figure 6 is an enlarged sectional view of the auxiliary rim, showing another embodiment of the present invention.

Figure 7 is an enlarged sectional view of the auxiliary rim, showing another embodiment of the present invention.

Figure 8 is a sectional view taken on line 8—8, Figure 7, and looking in the direction of the arrows.

Referring to the drawing by numerals, I designates a hollow spoke of an ordinary wheel (not shown) upon which is suitably mounted the standard primary rim 2. The hollow spoke I may be connected at its inner end to a hollow hub Ia (Fig. 2), through which air may enter hollow spoke I. My novel auxiliary rim 3 comprises a body portion 4, forming an air cooling chamber 5, and the body portion 4 terminates in inwardly-extending and outwardly-spreading legs 6. These legs 6 slidably engage at their inner ends the inner face of the primary rim 2, as shown. (See dotted lines Fig. 3.) The auxiliary rim 3 is preferably made of metal which possesses some flexibility. The auxiliary rim 3 is either pressed or shrunk onto the standard, primary rim 2.

During the construction of the auxiliary rim 3, pressed-in grooves 7 are formed in spaced relation all around the sides of the legs 6; these grooves 7 are formed in pairs, and the grooves of each pair register, producing inwardly extending abutting contacting and spacing lugs 8, as clearly shown in Figure 5. This novel structure assures of free ventilation in the interior of the tire, because the legs of the auxiliary rim will not be closed together by foreign substances, but will be kept slightly spaced apart to insure a free circulation of the air, which air may enter body 4 from hollow spokes I, or from under legs 6, or both.

In the embodiment shown in Figure 6, the pressed-in lugs 8a are bent over in parallelism, and abut or contact, as clearly shown, leaving the legs 6 spaced apart sufficiently to give the free air ventilation, as is desirable, and as is the case in the preferred embodiment as specifically shown in Figure 5.

In the embodiment shown in Figures 7 and 8 the bent in lugs 8b have their inner ends contacting, whereby a positive spacing of the legs of the auxiliary rim is assured at all times, to give the free circulation or ventilation of the tire, as accomplished with the other embodiments of this invention.

A standard shoe 9 is placed upon the primary rim 2 in any suitable manner. This shoe 9 has an outer hard rubber tread 10 with an inner fabric unit 11. An inner tube 12 is placed in the shoe 9, and this tube 12 conforms to the shape of the shoe 9 and the auxiliary rim 3. The auxiliary rim 3 is faced or covered on its outside with a light weight canvas 13. A suitable valve device 14 is attached, whereby air may be forced into the inner tube 12.

This improved tire does not in any way affect the true running qualities of a wheel on which it is mounted, and adds very little weight, over an ordinary tire, while the tire of this invention is cooled by drawing off the traction heat. This invention also practically eliminates any dangers attended on a blow-out, because if a blow-out occurred the wheel would only drop about two to two and one-half inches or no more than if the tire was under-inflated, as indicated clearly by dotted lines A in Figure 1; this position shown by dotted lines A would prevent the squeezing of the shoe out from under the edges of the primary rim, and thereby eliminate the sharp swerving of the car, whereby accidents occasioned by blow-outs are prevented, inasmuch as the car is allowed to travel in a straight line to a normal stop. Of course, if necessary, the car could be driven on the deflated position, as indicated by A.

In Figure 3, "B" designates, by dotted line, the condition of the auxiliary rim 3 when considerable pressure is placed thereon, showing that said rim is resilient, and that, by reason of the novel spacing means, the sides or legs of the body of the auxiliary rim are never closed sufficiently together to in any way affect the efficient operation of this device, since the air is permitted to freely circulate, within the tire as a whole, by means of the novel spacing and engaging lugs, irrespective as to the specific type of lugs used, as illustrated in the several embodiments of this invention.

While I have described the preferred embodiments of my invention and illustrated the same in the accompanying drawing, certain minor changes or alterations may appear to one skilled in the art to which this invention relates during the extensive manufacture of same, and I, therefore, reserve the right to make such alterations and changes as shall fairly fall within the scope of the appended claims.

What I claim is:

1. In a tire, the combination with a primary rim, of an auxiliary metal rim provided with metal legs on said primary rim, said metal legs provided with integral spacing means pressed in from their inner faces, and an inner tube and a shoe on said auxiliary and primary rims.

2. In a tire, the combination with a primary rim, of an auxiliary metal rim provided with metal legs on said primary rim, said metal legs provided with integral abutting spacing means pressed in from their inner faces, and an inner tube and a shoe on said auxiliary and primary rims.

3. In a tire, the combination with a primary rim, of an auxiliary rim on said primary rim, said auxiliary rim provided with integral portions pressed in to form lugs, said lugs in abutting pairs, the lugs of each pair having their abutting ends entirely engaging end-to-end, and an inner tube and a shoe on said auxiliary and primary rims.

4. In a tire, the combination with a primary rim, of an auxiliary yieldable rim on said primary rim, said auxiliary rim provided with inwardly bulged sides, said sides provided with integral sets of abutting lugs spacing the same apart, and an inner tube and a shoe on said rims.

5. In a tire, the combination with a primary rim, of an auxiliary rim on said primary rim, said auxiliary rim provided with inwardly-extending contacting spacing lugs, and an inner tube and a shoe on said rims.

6. In a tire, the combination with a primary rim, of an auxiliary rim on said primary rim, said auxiliary rim provided with inwardly-pressed lugs, said pressed lugs arranged in contacting pairs, and an inner tube and a shoe on said rim.

7. In a tire, the combination with a primary rim, of an auxiliary rim on said primary rim, said auxiliary rim provided in its sides with punched-in and bent-back and contacting lugs, and an inner tube and a shoe on said rim.

8. In a tire, the combination with a primary rim, of an auxiliary rim on said primary rim, said auxiliary rim provided in its sides with bent-in lugs arranged in pairs, said lugs of each pair having their ends in direct contact, and an inner tube and a shoe on said rims.

EARL VON BON HORST.